Oct. 4, 1966 A. H. IVERSEN ET AL 3,276,458
ULTRA PURE WATER RECIRCULATING SYSTEM
Filed Jan. 16, 1963 4 Sheets-Sheet 1
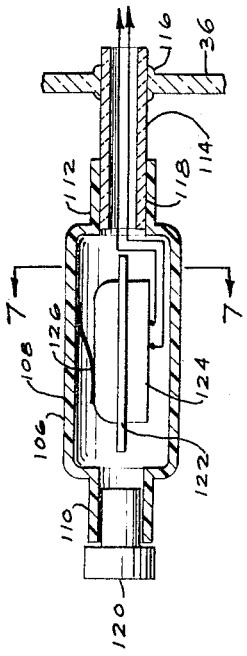
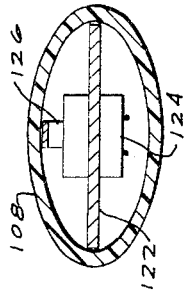
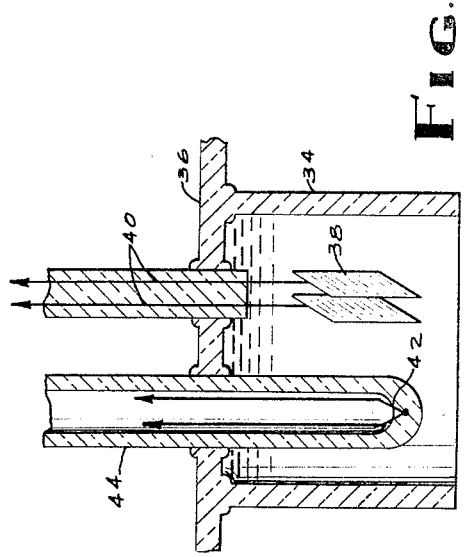
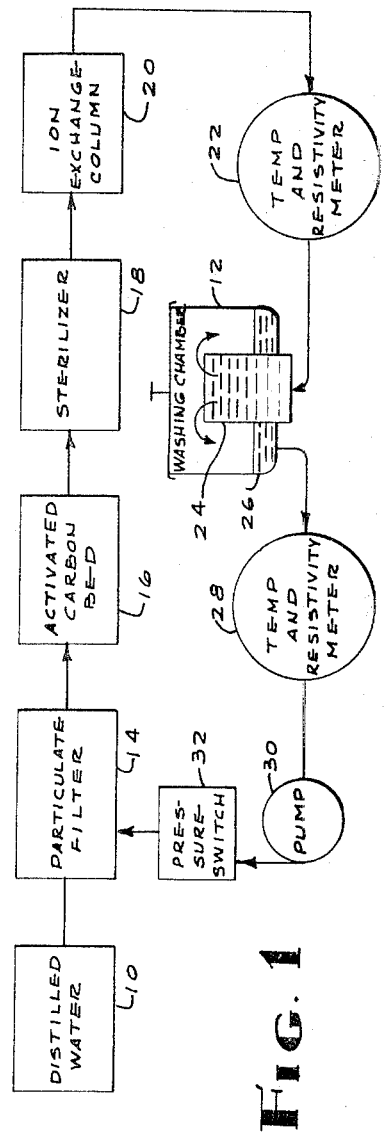
ARTHUR H. IVERSEN
LARRY L. DAVIS
INVENTORS.
BY Nilsson & Robbins
ATTORNEYS.

ARTHUR H. IVERSEN
LARRY L. DAVIS
INVENTORS

BY Nilsson & Robbins
ATTORNEYS

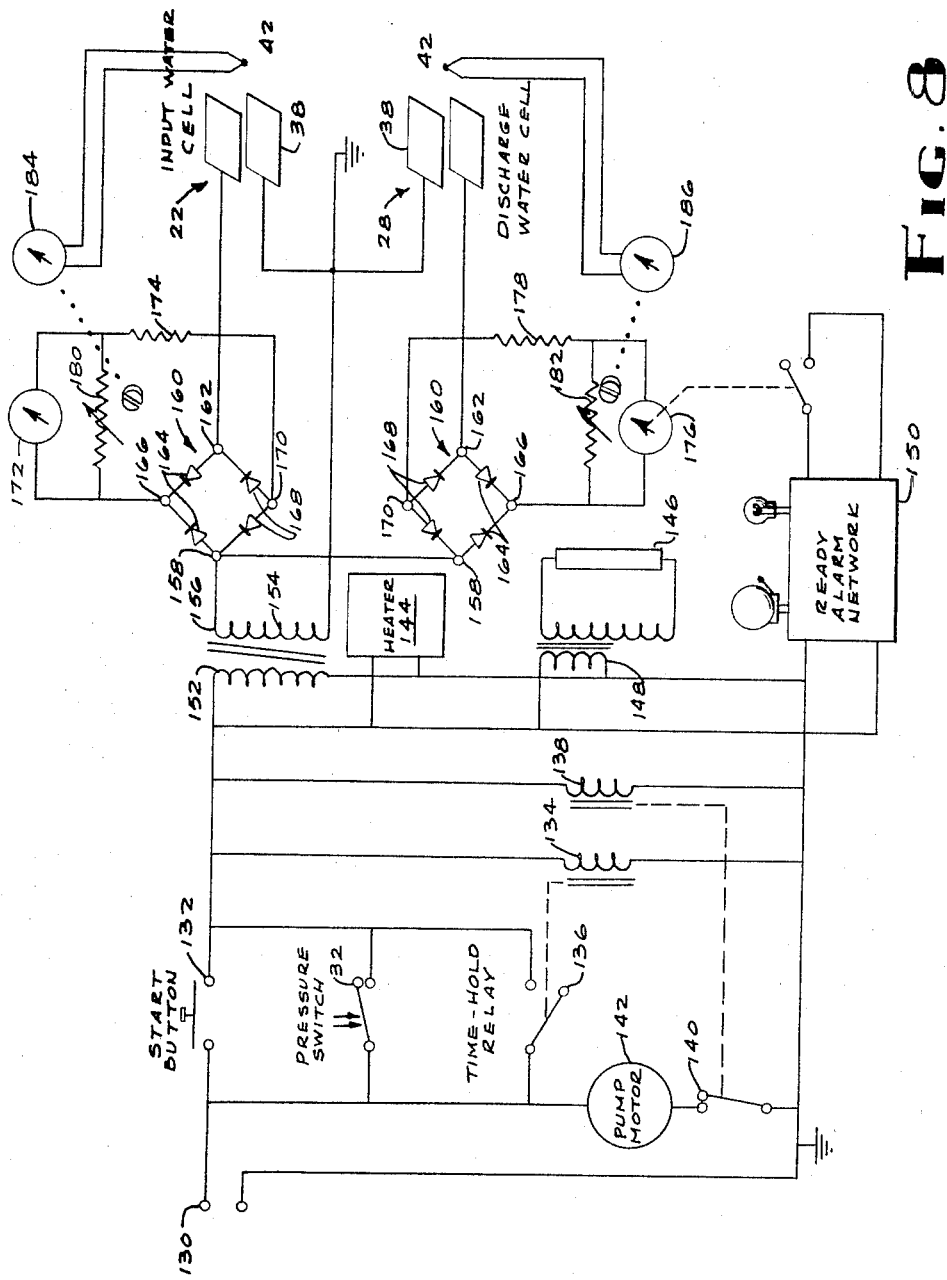

ARTHUR H. IVERSEN
LARRY L. DAVIS
INVENTORS

BY Nilsson & Robbins

ATTORNEYS.

3,276,458
ULTRA PURE WATER RECIRCULATING SYSTEM
Arthur H. Iversen, 519 Nimitz Ave., San Francisco, Calif., and Larry L. Davis, 4345 Manzanita Drive, San Jose, Calif.
Filed Jan. 16, 1963, Ser. No. 251,957
7 Claims. (Cl. 134—57)

This invention relates generally to a self-contained recirculating system providing and utilizing water of ultimate or near ultimate purity.

Extremely pure water is a critical requirement in many modern industries. For example, electroplating, mirror silvering, photographic film washing, and depositing of phosphors on cathode ray display tubes are applications where highly pure water is essential; and the purer it is, the more successful and consistent are the results of the process. A particular example is in the research and manufacture of modern electron devices such as, for example, transistors, where certain desirable performance characteristics have been found to be repeatedly achievable when the devices or their contamination sensitive parts have been washed with very clean and deionized water. For example the collector breakdown voltage of transistors and the emission of vacuum tube cathodes are consistently greatly improved when deionized water rather than merely distilled water or other solvents is used to clean them.

However, it is to be understood that even distilled and deionized water is not water of ultimate or "near ultimate" purity, toward the production of which this invention is directed. It should also be noted that throughout the specification water purity shall be denoted by its resistivity (or conductivity) as a manifestation of its contamination. The theoretical ultimate is determined by the presence of conductive H and OH ions from dissociation of the water molecules. The theoretical resistance of water not otherwise contaminated is approximately 71 megohms at 0° C. and approximately 25 megohms at 18° C. This variance with temperature is of course due to the temperature dependence of the water dissociation.

"Near ultimate purity" water is defined for the purpose of this specification as being within measurement errors of the theoretical purity of water over its entire temperature range from 0° C. to 100° C.

In addition to ionic type of contaminants other non-intrinsic materials must be removed from water to achieve near ultimate purity. Such matter includes for example organic growth such as bacteria or their byproducts, absorbed gases from the atmosphere, electrolysis products, and substances extracted or exuded from the walls of the containing system.

Attempts in the past to provide ultra pure water have typically been directed toward the development of systems and methods for producing distilled and sterilized and deionized water. In one such conventional example the water to be purified is pumped through a mechanical filtering system which removes particulate matter and thence through an activated carbon bed where organic material is removed. It is then sterilized by heating it to an elevated temperature near boiling and then passed through an ion exchange where the ionizable materials are removed. In one such system the materials of construction are a number of different metals, such as stainless steel and pure tin while in another system the materials of construction are different glasses, a plurality of metals and flexible plastic for joints and seals.

The functioning of conventional systems of this type requires that the water be cooled to approximately 60° C. before being passed through the deionizing column, in order to preclude the resin materials in the column from being adversely affected by the high temperatures of the near boiling water. Thus a heat exchanger with its attendant complexities and problems must be used. In addition the presence of the plurality of different metals in the water causes electrolysis since no two metals have the same boundary work potential or E.M.F. It is thus seen that contaminating ions are generated by the system itself as well as by the adverse side effects of the corrosive galvanic electrolysis. Even though the ion exchange column will remove any ions generated, it more quickly becomes saturated due to the electrolysis products, and the water once beyond the ion column cannot be deionized with respect to ions generated in those regions of the system. Furthermore, dissolved oxygen in the water reacts with the metals in the system, thus becoming an additional source of corrosion products. Again elevated temperatures exaggerate the problem.

The best result toward the production of ultra pure water in accordance with prior art techniques has been achieved by a judicious selection of and combination of the metals utilized so as to minimize the electrolyses and oxidation problems. However the contamination level of near ultimate purity water is in the parts per billion and the contaminating effects heretofore enumerated are relatively extremely gross, with electrolysis constituting a major source.

Another area of difficulty experienced in the prior art is that the use of water at elevated temperatures results in a major loss of measuring sensitivity. The resistance of pure water goes from 18.8 megohms at room temperature to 1.3 megohms at 100° C., a decrease of almost a factor of 15. Thus at elevated temperatures a small change in the contamination level, that it conductivity, is virtually undetectable. This makes the problem of contamination detection extremely difficult at high temperatures.

In addition to providing water which does not approach near ultimate purity, and therefore results in unsatisfactory performance for many applications, the above and other attempts to produce ultimately pure water suffer from disadvantages of being impractically complex, slow in production or purity recovery, or requiring many manual operations and monitoring to prevent errors.

In addition, most prior art systems require a temperature reading of the water at one point and at one time for calibrating the system for water purity at a different time and place, which results in errors. Other systems utilize cellulose or particulate filtering and greased seals and other materials which contaminate the water with organic substances. Further in this connection it may be noted that cellulose and other organic filtering materials cannot be readily cleaned and reused.

In general then it may be noted that there are two basic limitations on the purity of water that may be obtained. One is the ability of the system to remove various contaminants contained in the water and the other is the quantity of the contaminants introduced by the system itself. In a metal system the principal mechanism of the system contamination as indicated above arises from electrochemical corrosion, or galvanic action, which occurs under a variety of conditions. For example, a common method of construction of integrated pure systems according to the prior art is the use of tin-lined tubing and tin-coated members, tin being used because of its nontoxicity and relative resistance to corrosion, a thin film of stannic oxide provide a protective layer on the tin surface thereby minimizing any further oxidation. However, in the water system, design requirements are such that not all components can be coated. For example the pump impeller or other components which suffer mechanical abrasion cannot be so coated because of the softness of tin. Another source is established if any joints are brazed or welded, because such a presence of two or more different metals in the water system sets up a current flow by virtue of their different E.M.F.'s. The acompanying ion flow and consequent corrosion products depend upon the metals involved. In some cases protective films tend to form which inhibit but do not prevent corrosion.

It might be considered that galvanic corrosion may be avoided if the system were composed of a single metal. However even in a single metal system where an appreciable amount of ordinary metals are exposed to water, corrosion arises from several sources. The degree to which any one mechanism contributes to the corrosion will vary with the materials involved and, in addition, more than one mechanism is generally operative.

Attempts to develop single metal systems have typically been directed toward the utilization of stainless steel because of its relatively excellent corrosion resistant characteristics and relative economy. However, even stainless steel is subject to a number of corrosion effects which in this critical art have been found to be significant.

One such corrosion effect is called stress corrosion which occurs because strained metal acts as a more reactive material. Tension shifts the potential in the anodic direction; and compression of the metal shifts the E.M.F. in the cathodic direction. Thus a potential difference is set up causing a corresponding current flow with accompanying corrosion products between different portions of the same piece of metal. Sources of these stresses are the welding between various components or leak-tight thread connections or other mechanical joints between interconnecting tubing of various components and the like.

A second corrosion effect is called inter-granular corrosion, to which stainless steel is particularly susceptible. At a weld there may be situated on either side of the weld line a zone where chromium carbide has precipitated, leaving this zone depleted of elemental chromium, the element responsible for the protective film on stainless steel. Susceptible zones will appear around the grains and corrosion will be initiated.

Still another type of corrosion is the crevice corrosion which is caused by oxygen exhaustion in crevices. A crevice may be defined not only as a crevice due to, for example, overlapping joints, threaded connectors, and the like, but also to stagnant corners and crevices caused by foreign matter, such as particles which have settled or become wedged against the walls or pipe in the system. This corrosion is due to the fact that in the crevice region oxygen replenishment is so slow that quite minor sensitive spots, which would not become sites of active corrosion situated elsewhere, can in their sheltered situation suffer corrosion attack.

Another type of corrosion is due to moto-electric currents which are caused by a high velocity stream becoming a low velocity stream, and vice versa, such as is found when the water discharges from the interconnective tubing into the cleaning tank or canister. The turbulent high velocity flow tends to remove the metallic ions from the metal surface whereas the ion concentrations in the low velocity region is high. Thus a concentration cell is set up with consequent current flow and resultant corrosion products.

However even if it were possible to eliminate all sources of bi-metallic corrosion, as well as those discussed above in connection with the single metal corrosion, it would still not be possible to avoid the corrosion products due to impingement attack from particles such as those which have been removed from the articles being cleaned by the pure water and by bubbles in the water system which may be generated from dissolved gases or which arise when the parts are submerged in the cleaning tank or when air replaces water being withdrawn from a storage tank. The damage caused by the impact even by air bubbles under conditions where they break up into smaller ones may be due to the complicated system of stresses produced, some of which are very well suited to break up the protective fims on the metals and, sometimes, to pull off fragments thereof.

A local impact on a film-free metal surface may dent the surface; if the stress exceeds the elastic limit, a permanent depression in the metal will be produced; if not the metal will spring back to its original shape. It is not likely, in such a case, that metallic fragments will be dislodged unless the metals are brittle or have become very brittle through cold work produced by numerous former impacts. If however the metal carries a film of oxide, the denting of the metal is likely to cause cracking of that film. In cases where the stress applied exceeds the elastic limit of the metal the cracks in the oxide will remain. In cases where the stress in the metal is purely elastic, cracks in the oxide may close up to some extent; but the oxide is unlikely to weld together completely and will remain leaky. Continued impacts at the same point are likely to permit chemical action at that point to continue and thus it may be seen that an impact which would produce limited mechanical damage to the metal may lead to serious chemical damage.

It is therefore an object of the present invention to provide a system for the production and maintenance of ultimate purity water; that is, water within 3% of the theoretical ultimate purity over the full temperature range.

It is another object to provide such a system which is more effective and is not subject to the disadvantages of the prior art.

It is another object to provide such a system which includes a washing chamber for utilizing the pure water and which is fully automatic and highly reliable.

It is another object to provide such a system which provides directly and continuously a reading of the purity of the water.

It is another object of the present invention to provide such a system which continually extracts any impurities in the water in the system.

It is another object to provide such a system which contains no contaminating materials and which does not exhibit any electrolysis or galvanic action.

Briefly, in accordance with one example of the present invention these and other objects are achieved in a substantially closed loop recirculating water machine which includes in series a particulate filter, an activated carbon filter, a sterilizer, an ion exchange column, a single washing chamber having temperature and resistivity meters coupled to its input and output, and a recirculating pump. The system may be fed initially with distilled water from an outside source.

The particulate filter may be of the character having a fritted glass element or a glass wool element. The sterilizer may be a germicidal ultraviolet lamp which is surrounded by a water jacket through which the water to be sterilized is passed. At the input to the washing chamber the temperature and resistivity dip cell are disposed adjacently to each other to minimize any error in the resistivity reading due to a temperature gradient between the dip cell electrodes and the sensitive element for the thermometer.

Throughout the system the only substances which are wetted by the water are materials which produce no corrosion products, have zero E.M.F. with respect to all the other substances, and are insoluble in water. Therefore the water is permitted, in the system, to contact only ceramic, glass, Teflon, and a single metal, which, in this example, is the platinum electrode of the resistivity dip cell. All portions of the circulating pump with which the water comes in contact are coated with a non-contaminating substance such as Teflon.

Electrical circuitry of the system comprises primary and control circuitry which includes the pump motor with an incorporated under-pressure switch and a pressure buildup time delay relay and, in this example, an ultraviolet germicidal lamp. The resistance measuring circuitry is effectively two measuring and indicating circuits which measure the water resitivity at 2 points in the water system, namely the water resistance at the input and discharge sides of the washing chamber. The water resistivity is measured with an alternating current flow through the water to eliminate any error in measurement due to polarization. A one percent regulated alternating current voltage is supplied through meter bridge circuits to the immersed resistivity cells by a voltage regulating transformer. The ohmmeter circuitry, although it senses with an alternating current signal, is actuated by direct current supplied by bridge rectifiers in the meter bridge circuit. The overall resistance circuit is otherwise a substantially conventional series type direct current ohmmeter, having a total internal circuit impedance equaling the mid-scale resistance indication required. Each meter utilizes a logarithmic resistance scale for indicating water resistance directly in megohms.

An alarm circuit is provided to indicate to the user that the water resistance has dropped to a predetermined point and that the parts being washed are therefore clean. Both of the meters in the two resistance measuring circuits are electrically similar; however, the meter in the water discharge circuit is, in this example, a meter relay type, the contacts of which are used to operate a higher current capacity slave relay. The slave relay in turn has contacts which are used to operate an alarm bell and indicating lamp.

Further details of these and other novel features and their principles of operation as well as additional objects and advantages of the invention will become apparent and be best understood from a consideration of the following description taken in connection with the accompanying drawings which are presented by way of an illustrative example only and in which:

FIG. 1 is a block diagram of an ultra pure water machine constructed in accordance with the principles of the present invention;

FIG. 2 is a cross-sectional view of an example of an immersed sensing cell in the combination illustrated in FIG. 1;

FIG. 6 is a sectional view of a pressure sensitive safety switch;

FIG. 7 is a cross-sectional view of the structure shown in FIG. 6 taken along the lines 7—7 thereof;

FIG. 8 is a schematic diagram of an example of the electrical circuitry utilized in the combination of the present invention;

Figure 4:
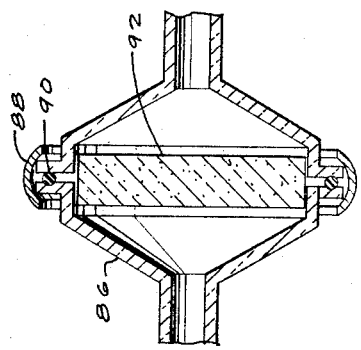
FIG. 4 is a sectional view of an example of a particulate filter indicated in FIG. 1.

Referring to the particular figures, it is stressed that the detailed showing is by way of example only and is presented in the cause of providing what is believed to be the most useful and readily understood description of the principles of the invention. The details shown are not to be taken as a limitation upon the scope of the invention which is defined by the appended claims forming a part of this specification.

In FIG. 1 the production and maintenance of ultra pure water may be seen to proceed generally as follows. A source of distilled water 10 is coupled to the recirculating system to fill the system initially. A still is not needed within the recirculating system because the water in the washing chamber 12 after it has been exposed to the electron device parts for washing them is typically at least as clean and pure as water normally is immediately after being distilled. The distilled water from the source 10 is pumped through a mechanical filtering unit which includes a particulate filter 14 for removing sub-micron sized particulate matter. The water then proceeds to an activated carbon bed 16 wherein gases, organic matter, and other contaminating chemicals are removed. A sterilizer 18 then receives the water and kills or decomposes viable organic matter such as bacteria and other microbes. The sterilizer 18 may accomplish its function either by heating the water to an elevated temperature, near boiling, or by passing the water in the close proximity of a germicidal lamp such as an ultraviolet tube. The highly filtered and sterilized water is then passed through an ion exchange column 20, which is preferably of the mixed bed type, where all ionizable contaminating materials are removed from the water in one step by passing it through a single intimate mixture of cation and anion exchange resins instead of through a plurality of separate function, strongly acid, then strongly basic, exchange resins. A particularly suitable mixed bed column may be provided in a column filled with Amberlite MB–1, a product of Rohm & Haas Company, Philadelphia, Pennsylvania.

The water at the output of the ion exchange column is very near ultimate purity, and its molecular water composition is contaminated substantially only by the presence of dissociated water molecules, namely, H+ and OH— ions. As the water in this state of purity is passed into the washing chamber 12, it flows past a dip cell 22 which contains the sensing elements for temperature and resistivity determination. The washing chamber 12 may be, as indicated, a single-chamber counter current washer of the fountain type which is particularly useful for washing small devices, which may be supported on a Teflon-coated rack within the inner cylindrical fountain portion 24. The water, after flowing past the supporting rack and the devices to be cleaned, is immediately removed from the vicinity of the rack and is spilled over into an outer collecting basin 26, from whence it flows through a second dip cell 28. After the water passes through the second dip cell 28 it is recirculated through the particulate filter 14 and so on around the closed system. Interposed in the loop of the recirculating system is a circulating pump 30 and a safety pressure switch 32. The pump 30 may be substantially conventional except that all of its parts which are wetted by, or which come in contact with, the water are coated with a non-contaminating substance such as Teflon.

In the event of any leak in the recirculating system, with an incumbent loss of water and therefore water pressure, the mechanical seals in the pump might soon burn out or be otherwise damaged from overheating. To prevent this from happening the pressure switch 32 is inserted immediately after the pump 30 in the system so that as soon as the hydraulic output of the pump 30 becomes significantly decreased, the pressure switch 32 is actuated and the system is shut down automatically. A more detailed showing of the structure of the pressure switch 32 as well as of the other components and elements shown schematically in FIG. 1 will be discussed and described in more detail below in connection with a description of the subsequent figures.

Referring to FIG. 2 an example of the tip cell 28 of FIG. 1 is shown in more detail. A cylindrical baffle 34 which may be of hard glass in a form of an open ended cylinder is sealed to the inner side of the system wall 36 and extends with its open end toward the interior of the circulating water system. Immersed also into the water system and disposed protectively within the baffle 34 are a pair of platinum resistivity sensing electrodes 38. The electrodes may be disposed in juxtaposed relationship supported at the lower ends of a pair of platinum supportnig strands 40. The electrodes 38 and the supporting strands 40 may be the only metallic substances that are wetted by the water in the recirculating system. The platinum of which these elements are composed may be inserted into the system after they have been properly cleaned and will not exhibit any contaminating effect. Also immersed within the dip cell baffle 34, in order to be as closely disposed as possible to the electrodes 38, is a temperature-sensing thermocouple 42. A closed ended hard glass tube 44 may be utilized as shown to support the thermocouple 42 in the desired location. The tube 44 may be partially filled with glass after the placement of the thermocouple 42 therewithin, in order to support, in a thermal conductive relationship with the surrounding water, the thermocouple 42. Alternatively the closed end tube 44 may be substantially entirely filled with the thermally conducting and supporting glass. Again it is to be noted that the entire dip cell 28 and its associated assembly cause contact of the water by only the hard glass of the system and the platinum electrodes and their supporting strands. Thusly the dip cell assembly in spite of its plurality of sensing abilities neither exhibits contaminating leaching or any potential electrolysis.

Figure 3:
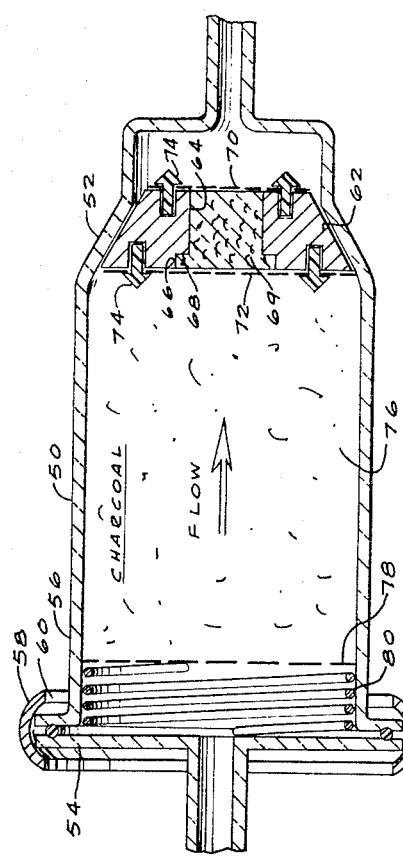
FIG. 3 is a sectional view of an example of an activated carbon filter utilized in the combination of the invention.

Referring to FIG. 3 an example of the activated carbon bed of FIG. 1 is illustrated. An overall demountable envelope 50 is provided having a tapered retaining shoulder portion 52 disposed toward one end and a sealing end portion 54 which is demountably coupled to a full diameter portion 56 at the opposite end of the envelope 50 by means of a Teflon ring gasket 58 mounted concentrically between the sealing end portion 54 and a sealing flange portion 60 which terminates the otherwise open end of the full diameter portion 56.

As with all other glass components of the system the envelope 50 is fabricated of a hard low silicate glass such as Pyrex since its water solubility or leaching characteristics are excellent; whereas the water solubility for soft glasses such as soda-lime types is relatively high and therefore intolerably contaminating to an ultimate purity system. Similarly the ring gasket 58 may be fabricated of Teflon becauses of its infinitesimal water solubility and because organic contaminants released by most other plastic gasket materials or grease seal materials are extremely deleterious to the performance of electron devices. Further these organic contaminants are particularly difficult to remove by washing. Polyethylene materials, for example, exhibit appreciable transfer of organic contaminants to the part being washed. Teflon, on the other hand, exhibits no contaminant transfer.

Disposed against the retaining shoulder portion 52 of the envelope 50 is a retaining plug 62. The retaining plug 62 may generally be in the form of a truncated cone which is centrally relieved to define a bore 64 having a first, reduced, diameter for a major portion of its length from the output end of the retaining plug 62. The bore 64 has an enlarged diameter portion 66 near its input or base end which forms an annular retaining shoulder 68. The body of the retaining plug 62 may be composed of glass or solid Teflon or, for greater strength and rigidity, may be stainless steel coated on all of its surfaces with Teflon.

The bore 64 may be packed with quartz or Pyrex glass wool and retained therein by a pair of stainless steel, Teflon-coated retaining screens 70, 72. The retaining screen 72 is disposed across the base of the retaining plug 62 and presses a peripheral portion of the glass wool 69 against the annular retaining shoulder 68 to prevent it from creeping radially inwardly away from the periphery of the bore 64. The retaining screens 70, 72 are held securely against the faces of the retaining plug 62 by Teflon screws 74.

The function of the glass wool packed retaining plug 62 is to retain, against the flow of the circulating water, a bed 76 of activated charcoal which is in turn retained thereagainst by a Teflon-coated stainless steel screen 78 disposed near the sealing end portion of the envelope 50. For purposes of holding the charcoal bed in place as during shipment, a Teflon coated steel spring 80 is disposed under axial compression between the screen 78 and the sealing end portion 54. A sealing clamp 82 under adjustable circumferential tension is demountably disposed circumferentially over the flange 60 and the outer periphery of the sealing end portion 54 for the purpose of providing an axial compression on the Teflon gasket 58.

In FIG. 4 an example of the particulate filter 14 of FIG. 1 is illustrated. An enlarged demountably flanged filter envelope 86 is provided with an axial compression providing clamp 88 and a Teflon gasket 90 disposed between the two flanged portions of the envelope 86. A removable and cleanable fritted glass filter element 92 is shown supported within the filter envelope 86. The fritted glass provides a "volumetric" filtering for sub-micron-sized contaminating particles while creating a relatively small impedance to the flow of the circulating water. In addition, the fritted glass filter elements may be removed and readily cleaned by any desired solvent or cleaner and at any temperature without deleterious decomposition or other damage.

A practical alternative to the filter as shown in FIG. 4 is provided in accordance with the present invention by a volumetric filter constructed along the lines of the retaining plug 62 of FIG. 3. A greater volume of glass wool (Pyrex or quartz) may be retained between a pair of Teflon screens in a manner to be readily removable for cleaning or replacement as with the filter element 92 of FIG. 4.

Further advantages of the "volumetric," or liquid impingement filter, over conventional planar filters or screens stem from the fact that in the latter, the openings must be smaller than the size of the particle to be stopped; and if not stopped at the front surface of the screen, they will not be stopped at all.

This causes a high impedance to the fluid flow and requires much higher pressure in the system for a given current. The higher pressure of course increases the probability of leaks and ruptures in the system and tends undesirably to force some particles through the screen, either by direct force or by breaking the particle into smaller pieces. In addition, needle-shaped particles may pass through the filter.

A further disadvantage of the planar type of filter is its low capacity for holding the particles which necessitates frequent down time periods for cleaning or replacement of the filter.

The disclosed volumetric filter, on the other hand, provides a low impedance, has a large capacity, and, since partial entrapment is not dependent on a hole size, but rather on the fibre maze, the particle sizes trapped extend well into the submicron region.

Figure 5:
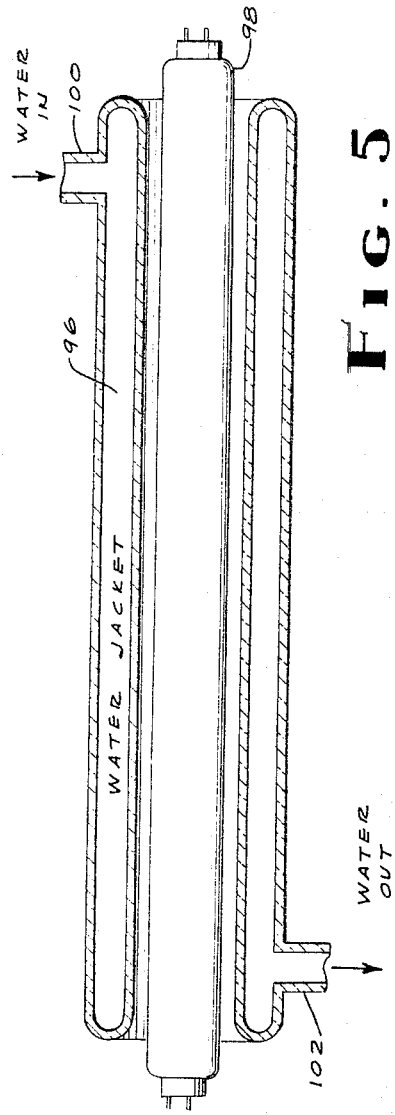
FIG. 5 is a sectional view of an example of an ultraviolet germicidal lamp which may be utilized in the combination of the invention as illustrated in FIG. 1.

In FIG. 5 an example of the sterilizer 18 is illustrated which is of the ultraviolet germicidal lamp type. A hollow cylindrical water jacket 96 is provided which closely surrounds an ultraviolet germicidal lamp 98. The water jacket is disposed as closely radially to the lamp 98 as possible and its annular thickness is such that any water entering at the inlet 100 and leaving at the exit 102 has been thoroughly sterilized. It has been discovered that recirculation water systems without sterilization may provide low conductivity and low non-ionizable contaminants; but cultures and other tests have shown that without sterilization in each cycle the water contains organic substances which are seriously deleterious to the electron devices being washed. It is to be noted that the viable organisms, once killed, are readily removed by other elements of the system, viz. the charcoal bed and, to a significant extent, the ion column resins.

Referring to FIG. 6 an example of a safety pressure switch 32 is illustrated. A Teflon envelope 106 having an enlarged diameter mid-portion 108 and reduced diameter end portions 110, 112 is provided. A short length of glass tubing 114 is sealed to an opening 116 in the system wall 36 and extends inwardly to form a clamping neck 118 within the reduced diameter portion 112 of the Teflon envelope 106. The opposite end 110 of the Teflon envelope may be closed by a snugly fitted glass or Teflon plug 120. Disposed within the enlarged diameter portion 106 of the Teflon envelope 108 and mounted on a distorting vane 122 is a Microswitch 124. The distorting vane 122 not only supports the Microswitch 124 but also flattens the enlarged diameter portion 108 of the Teflon envelope 106 so that increased hydraulic pressure outside of the Teflon envelope 106 will ensure a collapsing tendency of the envelope in the region of the actuating arm 126 of the Microswitch 124, thereby causing the switch to be sensitive to predetermined changes in the hydraulic pressure within the recirculating water system. Thusly, for example, when the water pressure is relatively high the Teflon envelope will be relatively compressed; and when the hydraulic pressure is low the Teflon envelope will be extended to its maximum thereby releasing and changing the state of the Microswitch 124.

As implied herethroughout, it is important that the water system during a washing operation be a flowing system. The flowing water system is necessary to carry away the contaminants from the environment of the parts being washed. In the absence of such flow an equilibrium of contaminants between the washing chamber environment and the parts being washed will exist in which a finite proportion of the contaminants will always be at rest on the surfaces being cleaned.

Referring to FIG. 8 an example of an embodiment of the electrical circuitry of the present invention is illustrated. A pair of input terminals 130 may be coupled to an alternating current line not illustrated. A momentary contact start button 132 is provided which, when actuated, causes a relay solenoid 134 to close its contacts 136 for a time period of the order of a few seconds, thusly shorting out the start button 132. During this time a motor relay 138 is also energized and closes a set of contacts 140 to energize the pump motor 142. Very soon after the pump motor 142 is energized the pressure switch 32 is actuated in a manner to short out both the start button 132 and the time hold relay contacts 136. Thusly, for so long as a predetermined hydraulic pressure is maintained in the system the pressure switch contacts will remain closed and the entire system will remain energized. If, on the other hand, for any reason hydraulic pressure is lost, the entire system will be deenergized.

Also energized by the primary circuit just described may be a thermostatic controlled heater 144 which may optionally be included in the system for purposes of sterilization and/or faster washing.

A germicidal lamp 146 is similarly energized through a high voltage transformer 148 to provide auxiliary or independent sterilization of the recirculating water.

An alarm network 150 is also energized from the primary circuit but is controlled from the secondary, meter circuit to be discussed below.

A voltage regulating transformer 152 is provided for supplying a one percent regulated alternating current voltage across its secondary winding 154, one terminal of which may be grounded. The other terminal 156 of the secondary winding is coupled to the input terminal 158 of each of the meter bridge circuits 160, the output terminal 162 of each of which is coupled to one of the platinum electrodes 38 of the dip cells 22, 28.

The bridge circuits 160 each include a pair of diodes 164 having their cathodes coupled together to the negative terminal 166 and a pair of diodes 168 having their anodes coupled together to a positive terminal 170.

An "input" resistivity meter 172 in series with a resistor 174 is coupled between the terminals 166, 170 of one of the meter bridge circuits 160 while an "output" resistivity meter 176 in series with a resistor 178 is coupled across the terminals 166, 170 of the other meter bridge circuit 160.

Coupled in shunt across the input resistivity meter 172 is a temperature compensating potentiometer 180 and a similar potentiometer 182 is coupled in shunt across the output resistivity meter 176. The potentiometers 180, 182 are preset, as a direct calibration procedure, in accordance with the temperature indications on the thermometers 184, 186 respectively, each of which are voltmeters coupled to a respective thermocouple 42, associated with a particular pair of resistivity electrodes 38.

The output resistivity meter 176 is a meter relay type, the contacts of which, being preset to any predetermined voltage, or "resistivity" value, may be used to operate at higher current capacities, slave relay within the ready alarm network 150.

The bridge rectifier diodes 164, 168 may be silicon diodes, the type of which is selected to have a dependable low inverse leakage current, within the voltage and temperature range anticipated, adequate peak inverse voltage rating, and adequate forward current rating. A 1N2071 diode was chosen for use in a practical example of the invention even though its forward current rating is many times what is needed, because of its proven reliability of low inverse leakage current characteristics. The diode forward resistance changes versus temperature characteristics are of little significance when compared percentage-wise to the resistance being measured in the near ultimate purity water system of the invention.

With the back-to-back arrangement of the diodes in each bridge as seen by the resistivity meters and with the coupling of the input and output terminals of the bridge circuits to the source and to the dip cell electrodes respectively, it may be seen that the resistivity meters are provided with a direct current voltage indicating the resistivity between the alternating current energized dip cell electrodes 38. Thusly the meters are supplied with a direct current while the dip cell electrodes are energized by alternating current to avoid any polarization effects in the water.

The primary function of the "ready" alarm network 150 is to provide a signal, either audible or visual or both, when the resistivity of the water leaving the washing chamber 12 and entering the dip cell 28 has regained a predetermined purity indicating an ultimate or particularly desired degree of cleaning accomplished with regard to electron device parts being washed in the washing chamber 12.

Figure 9:
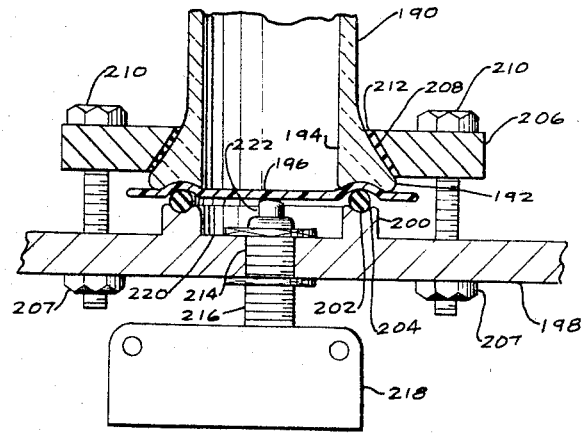
FIG. 9 is a sectional view of an alternative example of a pressure sensitive safety switch.

Referring to FIG. 9 an alternate example of the pressure safety switch 32 is illustrated. In this example there is shown a hollow glass tubing 190, which communicates with the interior portions of the water machine, and which is terminated in a flange 192 having an annular, retaining depression 194 across the end of the flange around its periphery. A disc 196 of thin walled, pliable Teflon is disposed in a closure manner over the flange 192 and extending radially outwardly beyond the periphery of the flange 192. A mounting plate 198 having a raised annular ledge 200 is disposed in a juxtaposed relationship with respect to the flange 192. The top, as viewed in the drawing, of the ledge 200 is annularly relieved to form a second retaining depression 202 in which is disposed a rubber O-ring 204.

The flange 192 of the tubing 190 is compressively urged toward the mounting plate 198 by an adjustable circular clamp 206 which includes a bearing collar 208 and a series of tension screws 210 which draw the clamp tightly toward the mounting plate 198. An annular rubber protecting pad 212 may be interposed between the collar 208 and the glass flange 192 to distribute the compressive forces evenly about the flange and to provide some resiliency in the junction.

In operation, the clamp screws 210 are drawn sufficiently into their respective nuts 207 to deform the Teflon disc 196 upwardly into the annular retaining depression 194 of the flange 192. This step is preferably accomplished with sufficient compressive force in the Teflon and O-ring to assure a water tight seal between the Teflon and the glass as well as to preclude any lateral slipping of the Teflon disc 196 with respect to the flange 192.

A bore 214 is provided in the mounting plate 198 near the center of the raised ledge 200 to receive the threaded supporting shaft 216 of a microswitch 218. A pair of retaining nuts 220 threaded onto the shaft 216 are screwed tightly against the mounting plate 198 in a manner to place the actuator plunger 222 in contact with the Teflon disc 196 so that when operating pressure exists in the fluid with the glass tubing 190, the Teflon disc is displaced downwardly enough to change the state of the switch with respect to its status when there is no operating water pressure.

Figure 10:
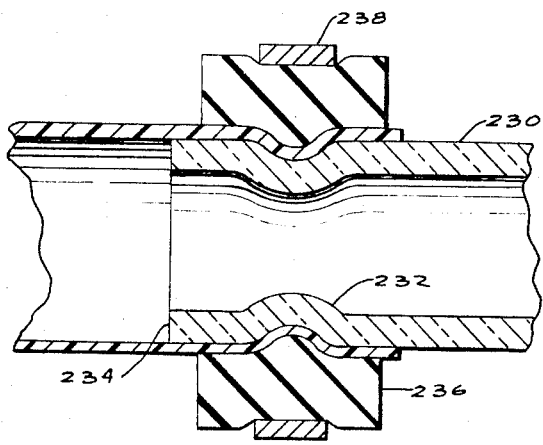
FIG. 10 is a sectional view of a glass to Teflon joint.

Referring to FIG. 10 a Teflon-to-glass seal in accordance with the invention is illustrated. A length of cylindrical glass tubing 230 is provided with a circular retaining depression 232 which extends about the periphery of the tubing 230 near its end 234. A length of thin-walled Teflon tubing as for a flexible joint or bend and having an inside diameter approximately equal to that of the outer diameter of the glass tubing 230 is slipped over the end 234 and past the retaining depression 232. A resilient rubber collar 236 is then disposed snugly about the Teflon tubing in the axially aligned position of the retaining depression 232. An annular compression clamp 238 is placed around the rubber collar 236 and drawn up until the Teflon is evenly deformed into the contour of the retaining depression 232. The resulting joint is resilient and flexible and yet will not leak or slip either by high amounts of torque or longitudinal stresses on the joints.

There has thus been described a near ultimate purity water machine and method which achieves all of the objects and exhibits all of the advantages set forth hereinabove.

What is claimed is:

1. A fluid recirculating system including the following components in series: a particulate filter for removing, from the circulating water, micron and submicron particulate contaminants; an activated carbon bed for removing contaminant gases and other chemicals; an ultraviolet sterilizer for retarding and killing organic viable organisms without appreciably raising the temperature of the water; an ion exchange column for removing ionizable contaminants; an input temperature and resistivity sensing dip cell; a washing chamber closed to the atmosphere; an output temperature and resistivity sensing dip cell; a water pump having all its internal, wetted surfaces composed of non-conductive, non-contaminating substance; means operably interconnecting all of the components of the system forming a closed fluid circuit, all components of the system and interconnecting means being fluid tight and closed to the atmosphere, there being no more than one non-corrodable and non-contaminating metal wetted by said water, and all wetted ducts, joints, and chambers housing the above components of said system being composed of hard, low silicate glass and non-contaminating plastic materials.

2. The invention according to claim 1 in which said temperature and resistivity sensing dip cells each comprises: a pair of spaced electrodes each having the same metallic composition; and a temperature sensing element disposed near and in close thermal coupling with said electrodes whereby said electrodes and said thermoelectric sensing element has substantially equal temperature at any instant of time.

3. The invention according to claim 2 which further includes a pressure sensitive switch having an actuator the displacement of which controls the state of said switch; and a pliable, non-contaminating wall portion, one side of said wall portion being exposed to the hydraulic pressure of said system and the other side being mechanically connected to said actuator of said switch whereby the magnitude of pressure differential on opposite sides of said pliable wall portion determine the state of said switch.

4. The invention according to claim 3 in which said particulate filter comprises a chemically substantially inert volumetric filtering element.

5. The invention according to claim 4 in which said filtering element includes fibrous glass wool.

6. The invention according to claim 4 in which said filtering element includes sintered glass frit.

7. The invention according to claim 4 which further comprises electrical circuit means for energizing said electrodes with an alternating current sensing signal and for providing a direct current signal the magnitude of which is proportional to the conductivity of the water between said electrodes.

References Cited by the Examiner

UNITED STATES PATENTS 1,890,265  12/1932  Rodman et al. _____ 210—258

FOREIGN PATENTS 569,660  6/1945  Great Britain.

OTHER REFERENCES

Bruns, Electronics, 132–135, May 27, 1960.

Thompson et al., Industrial & Eng. Chem., vol. 51, No. 10, pp. 1259–1264, October 1959.

REUBEN FRIEDMAN, *Primary Examiner.*

HERBERT L. MARTIN, *Examiner.*

R. HALPER, S. ZAHARNA, *Assistant Examiners.*